US012612745B2

(12) United States Patent
Saarenketo et al.

(10) Patent No.: US 12,612,745 B2
(45) Date of Patent: Apr. 28, 2026

(54) METHOD FOR OPERATING A MOVABLE COMPACTION DEVICE DURING MATERIAL COMPACTION WORK

(71) Applicant: ROADSCANNERS HOLDING OY, Rovaniemi (FI)

(72) Inventors: Timo Saarenketo, Rovaniemi (FI); Pekka Maijala, Rovaniemi (FI); Rani Hamrouche, Rovaniemi (FI)

(73) Assignee: ROADSCANNERS HOLDING OY, Rovaniemi (FI)

( * ) Notice: Subject to any disclaimer, the term of this patent is extended or adjusted under 35 U.S.C. 154(b) by 787 days.

(21) Appl. No.: 17/924,231

(22) PCT Filed: May 10, 2021

(86) PCT No.: PCT/FI2021/050344

§ 371 (c)(1),
(2) Date: Nov. 9, 2022

(87) PCT Pub. No.: WO2021/229146

PCT Pub. Date: Nov. 18, 2021

(65) Prior Publication Data

US 2023/0175211 A1 Jun. 8, 2023

(30) Foreign Application Priority Data

May 15, 2020 (FI) ..................................... 20205493

(51) Int. Cl.
*E01C 23/01* (2006.01)
*E01C 19/26* (2006.01)
(Continued)

(52) U.S. Cl.
CPC .............. *E01C 23/01* (2013.01); *E01C 19/26* (2013.01); *E01C 21/00* (2013.01); *E02D 3/02* (2013.01); *G01N 22/04* (2013.01)

(58) Field of Classification Search
CPC .......... E01C 19/26; E01C 21/00; E01C 23/01; E02D 3/02; G01N 22/04
(Continued)

(56) References Cited

U.S. PATENT DOCUMENTS 6,411,106 B1 6/2002 Holmes et al.
6,460,006 B1 * 10/2002 Corcoran .............. E01C 19/288
404/117
(Continued)

FOREIGN PATENT DOCUMENTS

WO 2014153263 A1 9/2014

OTHER PUBLICATIONS

International Search Report and Written Opinion in Application No. PCT/FI2021/050344, mailed Aug. 19, 2021, 11 pages.
(Continued)

*Primary Examiner* — Raymond W Addie
(74) *Attorney, Agent, or Firm* — Meunier Carlin & Curfman LLC

(57) ABSTRACT

In the method for operating a movable compaction device during material compaction work, moisture content of the material to be compacted is monitored. The method comprises steps of defining a compaction performance index for the material to be compacted, said compaction performance index being an electromagnetic character correlating with volumetric moisture content of the material, determining the compaction performance index value in a number of survey points of the material to be compacted during compaction work using electromagnetic measurement device, and controlling operation on the compaction device based on determined compaction performance index values. Determination of the compaction performance index includes sending at least one wideband electromagnetic pulse to the material to be compacted with a ground penetrating radar, receiving a reflected signal, measuring the power spectral density and peak to peak amplitude from the reflected signal and calculating the compaction performance index by using the measured density and amplitude.

10 Claims, 1 Drawing Sheet

100

(51) Int. Cl.

| | |
|---|---|
| *E01C 21/00* | (2006.01) |
| *E02D 3/02* | (2006.01) |
| *G01N 22/04* | (2006.01) |

(58) Field of Classification Search

USPC ........................................ 404/72, 84.05, 117

See application file for complete search history.

(56) References Cited

U.S. PATENT DOCUMENTS

| | | | | |
|---|---|---|---|---|
| 7,135,871 | B1 * | 11/2006 | Pelletier | G01N 22/04 |
| | | | | 324/640 |
| 2007/0151467 | A1 | 7/2007 | Furll et al. | |
| 2010/0172696 | A1 * | 7/2010 | Commuri | E01C 19/288 |
| | | | | 404/117 |
| 2012/0155961 | A1 * | 6/2012 | Norton | E02D 3/02 |
| | | | | 404/117 |
| 2018/0011039 | A1 * | 1/2018 | Colosimo | G01N 33/42 |
| 2018/0059143 | A1 * | 3/2018 | Pupalaikis | G01R 13/345 |

OTHER PUBLICATIONS

Search Report in Finnish Application No. 20205493, dated Dec. 1, 2020, 1 page.

Office Action in Finnish Application No. 20205493, dated Dec. 8, 2021, 5 pages.

Plati, Christina, et al.: "Assessment of Modern Roadways Using Non-destructive Geophysical Surveying Techniques", Surveys in Geophysics, Reidel, Dordrecht, NL, vol. 41, No. 3, Mar. 6, 2019 (Mar. 6, 2019), pp. 395-430.

Shangguan, Pengcheng, et al.: "Algorithm development for the application of ground-penetrating radar on asphalt pavement compaction monitoring", The International Journal of Pavement Engineering, vol. 17, No. 3, Oct. 30, 2014 (Oct. 30, 2014), pp. 189-200.

* cited by examiner 14   20   16                                    10

18                                                              12

100 defining a compaction moisture factor
for the ground layer to be compacted determining the compaction moisture factor value in a
number of survey points during compaction work controlling the operation on the compaction
device during compaction work

METHOD FOR OPERATING A MOVABLE COMPACTION DEVICE DURING MATERIAL COMPACTION WORK

CROSS REFERENCE TO RELATED APPLICATIONS

This application is a United States National Phase Patent Application of International Patent Application Number PCT/FI2021/050344, filed on May 10, 2021, which claims the benefit of priority to FI application No. 20205493, filed May 15, 2020.

TECHNICAL FIELD

A method for operating a movable compaction device during material compaction work, in which method the moisture content of the material to be compacted is monitored, said method comprising steps of defining a compaction performance index for the material to be compacted, said compaction performance index being an electromagnetic character correlating with the volumetric moisture content of the material, determining the compaction performance index value in number of survey points of the material to be compacted during compaction work using movable electromagnetic measurement device and controlling the operation on the compaction device during compaction work based on determined compaction performance index values.

BACKGROUND ART

In road construction or in any kind of ground supported construction projects, the supporting soil material needs to be compacted to gain optimal stiffness for the material layers. In road construction natural or crushed stone or gravel aggregate having a desired particle size distribution is used as construction material. In large scale road construction projects compaction of unbound road structures as well as embankment and subgrade soils are performed mainly using roller compactors. The amount of energy needed for the optimum compaction level depends mainly on the moisture content of the materials during compaction. If material is too dry or too wet, optimum compaction level cannot be achieved or it requires a lot of energy and time. In soil mechanic this optimum moisture content is mainly described as optimum Proctor moisture content and it is based on laboratory tests and gravimetric water content analysis (water content by weight). Typical optimum water contents by weight for gravel or crushed aggregates are 6-8%, for sandy material 9-12% and for silts and clays 20-25%. According to research made by the inventor optimum water content is on the limit range of inner and out range of capillary water. Optimum proctor moisture content is material specific value and must be analyzed before compaction in the laboratory. The gravimetric water content analysis takes at minimum few hours.

A problem relating to all laboratory tests is that they take a long time to perform and they require specific laboratory test equipment. Therefore, laboratory test methods are too slow and cumbersome to be used in field conditions during compaction process. Further, laboratory tests only provide information of the moisture content of the material from the location, where the test sample is taken. A limited number of samples taken from a large area do not give a reliable and accurate information from the moisture content of the whole area to be compacted.

Another parameter for monitoring the water content during the compaction is volumetric water content (water content by volume), which tells the volume of the water compared to the volume of the material. The problem with this parameter is that it is very difficult and time consuming to be determined. The third potential parameter in this work is saturation degree, which tells the relative amount of water filling the pore volumes of the material. This is perhaps the best parameter because in mineral aggregates generally 40-60% saturation degree equals optimum Proctor water content.

One promising parameter describing both volumetric water content and saturation degree is dielectric value of the material. The benefit of this method is that at the same time dielectric properties of the material to be compacted describe the viscosity of the water in the material to be compacted, which can be related to the quality of the aggregates and especially the quality of their fine fraction. Poor performers have higher dielectric value at the same gravimetric moisture content due to dielectric dispersion cause by lower viscosity of the water in the material.

The dielectric value does not define the moisture within a material, in fact, two different materials having the same gravimetric water content may present different dielectric value. Furthermore, the reflection technique, normally used with ground penetrating radar systems, provides the dielectric value only of the first few centimeters of the material and do not represent the deeper condition of the studied material.

Sensitivity of the ground penetrating radar (GPR) to moisture in mediums such as concrete, road structures and soils has been the subject of increasing research and studies. These studies mainly focus on either the change in amplitude or frequency and attempted to create models to evaluate the moisture content on one of these two elements. Accuracy of these models is still insufficient.

Document WO 2014153263 A1 discloses a system and method for asphalt density and soil moisture measurement using ground penetrating radar. In this method an electromagnetic signal is produced and transmitted to the road pavement material and a reflected electromagnetic signal is received. The moisture content of the pavement material is determined based on the frequency difference between the transmitted electromagnetic signal and the received electromagnetic signal or based on the measured dielectric constant.

An object of the invention is to provide a method for operating a movable compaction device during material compaction work, with which method the drawbacks relating to the prior art can be diminished.

The object of the invention is achieved with a method, which is characterized in what is disclosed in the independent patent claim. Some preferred embodiments of the invention are disclosed in the dependent claims.

SUMMARY OF THE INVENTION

In the method according to the invention for operating a movable compaction device during material compaction work the moisture content of the material to be compacted is monitored. Preferably the material is soil. Said method comprises the steps of defining a compaction performance index for the material to be compacted, said compaction performance index being an electromagnetic character correlating with the volumetric moisture content of the material, determining the compaction performance index value in a number of survey points of the material to be compacted during compaction work using movable electromagnetic measurement device and controlling the operation on the compaction device during compaction work based on determined compaction performance index values. Determination of the compaction performance index on each survey point includes sending at least one wideband electromagnetic pulse to the material to be compacted with a ground penetrating radar GPR, receiving a reflected signal, measuring the Power spectral density and peak to peak amplitude from the reflected signal and calculating the compaction performance index by using the measured power spectral density and peak to peak amplitude.

A first preferred embodiment of the method according to the invention further comprises steps of defining a power spectral density reference and peak to peak amplitude reference by calibrating the ground penetrating radar in the air. Alternatively, the method further comprises steps of defining a power spectral density reference and peak to peak amplitude reference by calibrating the ground penetrating radar in the soil.

In a second preferred embodiment of the method according to the invention the compaction performance index is calculated by equation $$CPI = \frac{(PSDm(\text{Direct Wave}) \times FF + PTPm(\text{Direct Wave}) \times AF) \times 100}{(PSDr(\text{Direct Wave}) \times FF + PTPr(\text{Direct Wave}) \times AF)}$$

where $CPI$ = Compaction Performance index $PSDm$ = Power Spectral Density measured $PSDr$ = Power Spectral density reference $PTPm$ = Peak to Peak Amplitude measured $PTPr$ = Peak to Peak amplitude reference $FF$ = Frequency weight factor $AF$ = Amplitude weight factor The two parameters, namely peak to peak amplitude and power spectral density may not contribute equally to the compaction performance index. Therefore, the weight of these parameters can be adjusted using multiplying factors to get a one parameter making more contribution that the other one by using FF (Frequency Factor) and AF (Amplitude Factor) as in the equation below, and thereby reach the optimal representation of change in volumetric moisture content during the compaction.

The values of the frequency factor and amplitude factor depend on the material and its properties. In principle, frequency factor FF value may be 0.5-0.9 and the amplitude factor AF may be 0.1-0.5. The sum of frequency factor FF and amplitude factor AF is one.

The compaction performance index calculated by using calibration value of the direct wave in the air gives a reference index that ultimately provides a map of relative change in compaction and moisture. On the other hand, when the calibration of the direct wave is done in a soil sample having an optimal moisture/compaction level, a more clear map of locations where there is too much or not enough moisture for the compaction is achieved.

Another preferred embodiment of the method according to the invention further comprises steps of determining the location of each survey point and storing the location and the corresponding compaction performance index value to a computer readable medium. Storing the information in a computer readable form makes possible to transmit the information to a remote location using wireless electronical data transfer means, such as 4G or 5G network or local wireless network. Preferably the locations of the survey points are determined using satellite positioning system, such as GPS (global positioning system), which satellite positioning system is arranged to said movable compaction device.

In a second preferred embodiment of the method according to the invention the electromagnetic measurement device is arranged to said movable compaction device and the determination of the compaction performance index value is done real-time continuously or periodically during movement of the compaction device.

In yet another preferred embodiment of the method according to the invention the wideband electromagnetic pulses are sent to the material to be compacted within 30 cm movement of the compaction device.

A yet another preferred embodiment of the method according to the invention further comprises a step of defining an optimum value or range for the compaction performance index, which optimum value or range corresponds to the optimum gravimetric moisture content, optimum volumetric moisture content or optimum saturation degree of the material to be compacted. When the type of the material is known, i.e. grain size distribution of the aggregate material is known, the optimum gravimetric or volumetric moisture content or optimum saturation degree of the material under compaction can directly be found from the known soil mechanics literature. The optimum value or range for the compaction performance index can be defined, when a material having an optimum gravimetric moisture content, volumetric moisture content or saturation degree is found and the compaction performance index or range for this material is determined. Thus, based on the grain size distribution of the material a rough correlation factor between the optimum compaction performance index and the optimum gravimetric or volumetric moisture content or optimum saturation degree can be calculated.

A yet another preferred embodiment of the method according to the invention further comprises steps of comparing the determined compaction performance index values of the material layer to be compacted and the optimum value or range of the compaction performance index and adjusting the operation of the movable compaction device, if the determined compaction performance index values differ from the optimum value or range of the compaction performance index.

In yet another preferred embodiment of the method according to the invention the movable compaction device is a roller compactor and the comparison of the determined compaction performance index values of the material to be compacted and the optimum value or range of the compaction performance index is done on the compaction work site by the operator of the roller compactor.

In yet another preferred embodiment of the method according to the invention the determined compaction performance index values of the material to be compacted and the optimum value or range of the compaction performance index are transmitted to a remote location, preferably to a construction site project office, the comparison of the determined compaction performance index values of the material to be compacted and the optimum value or range of the compaction performance index is done in the remote location and instructions to adjust the operation of the movable compaction device are transmitted from the remote location to the operator of the movable compaction device.

In yet another preferred embodiment of the method according to the invention the number of passes of the compaction device over the compacted area is calculated and the number of passes and the determined compaction performance index values over the compacted area are stored to a computer readable medium. This recorded file can be used as a document proving the quality on the performed compaction work.

An advantage of the invention is that it makes possible to adjust the operation of the movable compaction device based on real-time accurate information of the moisture content of the material to be compacted saving both the time and energy used in the compaction work.

A further advantage of the invention is that it improves the quality of the compaction work, because the moisture amount, which directly affects to the compaction properties of the material, is continuously monitored during compaction work.

A yet another advantage of the invention is that it can be implemented with existing measurement devices including GPS-device and ground penetrating radar. Using the method causes thus very low investment costs.

BRIEF DESCRIPTION OF THE DRAWINGS

In the following the invention will be described in detail, by way of examples, with reference to the accompanying drawings in which.

DETAILED DESCRIPTION

Figure 1:
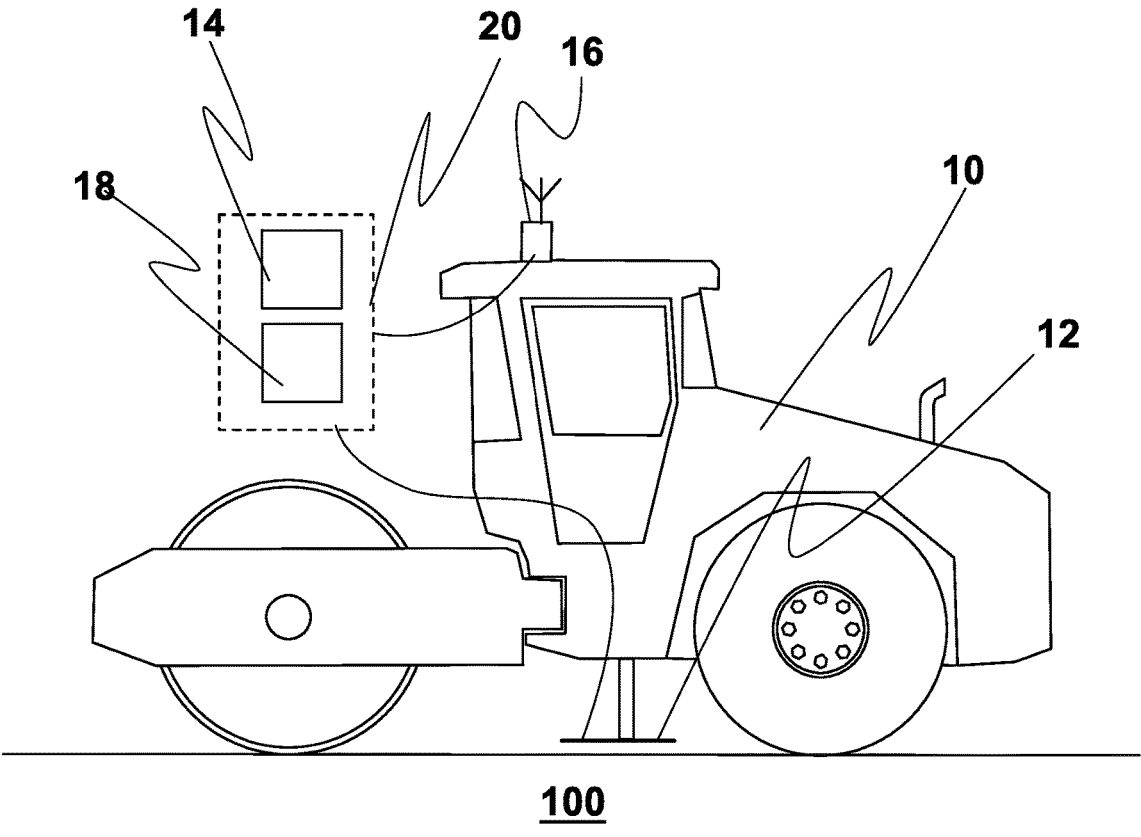
FIG. 1 depicts an example of a movable compaction device used in the method and FIG. 2 a depicts a flow chat of an embodiment of the method according to the invention.

In FIG. 1 an example of a compaction device used in the method is shown. The compaction device is as such known roller compactor 10, which is equipped with compaction moisture monitoring means. These compaction moisture monitoring means comprise a ground penetrating radar 20 having an antenna 12 and a data processing unit 14 including a processor, a memory, a display and input means such as a keypad. Preferably the data processing unit comprises a computer having a touch screen display.

The compaction moisture monitoring means further comprise data transfer means 18, which may operate in a wireless data transfer network, such as 4G, 5G or WIFI-network and a GPS-unit 16 (global positioning system-unit). The separate devices belonging to or being connected to the compaction moisture monitoring means are installed to the roller compactor. The driver of the roller compactor can see a parameter correlating with the moisture content of the material from the display of the data processing unit in real time while driving the roller compactor on the material layer, preferably soil layer, being compacted.

Figure 2:
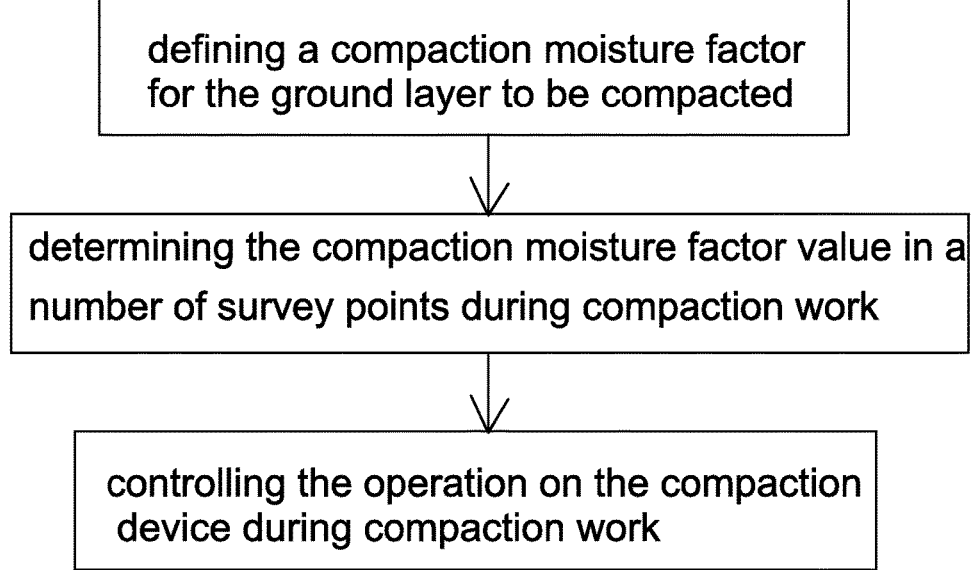

In FIG. 2 an example of a preferred embodiment of the method according to the invention is depicted as a simple flow chart. In the method of operating a movable compaction device during compaction work the moisture content of the material to be compacted is monitored. The moisture content information of the material is important because the compaction properties of the material are directly proportional to the moisture of the material, i.e. the aggregate to be compacted. If the compacted material is too dry, the material cannot be compacted properly or compaction requires a large number of compaction device passes. On the other hand, if the moisture of the material is close to the optimum moisture content, required compaction level of the material is achieved with a minimum amount of compaction device passes.

In the method a compaction performance index for the material layer to be compacted is defined. The compaction performance index used in the method is a measurable electromagnetic character correlating with the volumetric moisture content of the material. The compaction performance index value is determined in a number of survey points of the material to be compacted during compaction work using electromagnetic measurement device and the operation on the compaction device is controlled during compaction work based on determined compaction performance index values.

The method is implemented in field conditions with compaction moisture monitoring means of FIG. 1 installed to a movable compaction device, such as a roller compactor 10. In the method the roller compactor is driven on the surface of the material layer to be compacted. Preferably the material is soil. While the compaction device is moving on top of the material, the ground penetrating radar sends at least one wideband electromagnetic pulse to the ground to be compacted. The sent pulse reflects from the material and the reflected signal is received with the compaction moisture monitoring means.

Determination of the compaction performance index on each survey point in done by sending at wideband electromagnetic pulse to the material to be compacted with a ground penetrating radar GPR and receiving signals reflected from the material. A power spectral density and peak to peak amplitude are measured from the reflected signals. The compaction performance index by calculated based on the measured power spectral density and peak to peak amplitude.

The compaction performance index is calculated by equation $$CPI = \frac{(PSDm(\text{Direct Wave}) \times FF + PTPm(\text{Direct Wave}) \times AF) \times 100}{(PSDr(\text{Direct Wave}) \times FF + PTPr(\text{Direct Wave}) \times AF)}$$

where, $CPI$ = Compaction Performance index $PSDm$ = Power Spectral Density measured $PSDr$ = Power Spectral density reference $PTPm$ = Peak to Peak Amplitude measured $PTPr$ = Peak to Peak amplitude reference $FF$ = Frequency weight factor $AF$ = Amplitude weight factor In the method a reference value for the power spectral density and peak to peak amplitude is first determined by calibrating the ground penetrating radar in the air. When the compaction performance index is calculated by using calibration value of the direct wave in the air, the calculated index provides a map of relative change in compaction and moisture.

Alternatively, the in the method a reference value for the power spectral density and for the peak to peak amplitude can be determined by calibrating the ground penetrating radar in the soil sample having known moisture content. When using the calibration value of the direct wave from a soil sample having an optimal moisture/compaction level, a more clear map of locations were the moisture of the material is optimum or less optimum for compaction is provided.

The power spectral density may not contribute equally to the compaction performance index. Therefore, the weight of these parameters can be adjusted using multiplying factors, i.e. frequency factor and amplitude factor, to get a one parameter making more contribution that the other. The purpose of using these factors is to reach an optimal representation of change in volumetric moisture content during the compaction. Preferably, frequency factor FF is 0.5-0.9 and the amplitude factor AF is 0.1-0.5. The sum of frequency factor FF and amplitude factor AF is one.

The compaction performance index of the material layer is determined in several survey points either continuously or periodically while the compaction device is moving on the area to be compacted. Simultaneously, the GPS-unit defines the position of the survey points. The received electromagnetic signals are recorded and the data processing unit calculates from time domain and frequency domain components of these signals a compaction performance index of the layer being compacted. The position and the calculated compaction performance index in each survey point is stored to the memory of the data processing unit 14.

The specific power spectral density of the received signals is calculated from a set number of measurements (scans) in specified ground penetrating radar (GPR) time window using Fourier transform. GPR comprises a low frequency antenna with a center frequency ranging between 300 to 500 MHz coupled to the material layer to be compacted. The monitored frequency ranges between −8% and +16% around the center frequency of the antenna and calculated at a time window of −2 ns before the max amplitude of the direct wave to +4 ns after the max amplitude of the direct wave.

An initial measurement of the direct wave in the air is made first to characterize the antenna. The initial measurement value is used to normalize the power spectral density measurements when the antenna is coupled to the material. The percentage loss of power spectral density at the monitored frequency range in the material (relative to the air) can be calculated from at least 3 scans performed within 30 cm distance, i.e. within 30 cm movement of the roller compactor.

The power spectral density PSD discloses the distribution of a signal power as a function of frequency. Therefore, PSD allows the power distribution analysis and characterization of a signal over the studied frequency range. The PSD is commonly used in the signal processing and communications industry and well documented in the academic publishing.

The evaluation of the moisture content of the soil by measuring the specific power spectral density and peak to peak amplitude is based on the lowpass effect of the soil on the direct wave. It has been found, that the volumetric moisture content of the soil is proportional to the dielectric properties of the soil, whereby changes in the volumetric moisture content result changes also in the lowpass effect. Therefore, by calculating specific power spectral densities and peak to peak amplitudes of a direct wave, relative moisture change in the unbound layer during compaction can be estimated. Thickness of the monitored material layer can be between 20 to 60 cm measured from the surface of the material layer.

So instead of focusing on one dielectric property such as the dielectric value, in the invention it is focused to measurable changes of the electromagnetic wave properties by tracking the amplitude and frequency changes across the compacted field. Assuming that the material mix, used in compaction, is the same, then these changes are affected by the volumetric moisture and compaction degree in the field. The measured parameter can be either relative to a reference compacted material sample or relative to the air.

The determined compaction performance index reflects the change of the received electromagnetic signal properties caused by moisture variation in the measured soil under compaction and highlight critical locations of high loss of the power spectral density percentage that correlate with high probabilities of excessive level of moisture.

In the method an optimum value or range for the compaction performance index is defined. The optimum value or range corresponds to the optimum gravimetric moisture content, optimum volumetric moisture content or optimum saturation degree of the material to be compacted. The driver of the compaction device monitors the compaction performance index and compares the determined compaction performance index values of the material layer to the optimum value or range of the compaction performance index. Based on this comparison the driver can adjust the operation of the movable compaction device, if necessary. For example, if the determined compaction performance index value shows, that the volumetric moisture content of the material layer is below the optimum value, the driver may decide to execute supplementary compaction device passes over the area to be compacted. Alternatively, the driver may delay the compaction work and order the material layer to be wetted. On the other hand, if the determined compaction performance index value shows, that the volumetric moisture content of the material layer is above the optimum value, which may cause loss of strength of the material layer, the driver may decide to reduce the compaction passes or delay the compaction work until the material layer is dried.

Compaction performance index information can be sent with data transfer means to a remote location, for example to a project office, where an authorized person can make decision how to operate the compaction device. Instructions for the operation are then sent back to driver of the compaction device with the same data transfer means. The data processing unit calculates how many passes the compaction device has made over the whole area to be compacted and stores this information to the memory of the data processing unit to ensure—and to prove when needed-proper compaction coverage.

Some preferred embodiments of method according to the invention has been disclosed above. The invention is not limited to the solutions explained above, but the invention can be applied in different ways within the limits set by the patent claims.

The invention claimed is:

1. A method for operating a movable compaction device during material compaction work, in which method the moisture content of the material to be compacted is monitored, said method comprising steps of defining a compaction performance index for the material to be compacted, said compaction performance index being an electromagnetic character correlating with the volumetric moisture content of the material, determining the compaction performance index value in number of survey points of the material to be compacted during compaction work using movable electromagnetic measurement device and controlling the operation on the compaction device during compaction work based on determined compaction performance index values, wherein the determination of the compaction performance index on each survey point includes sending at least one wideband electromagnetic pulse to the material to be compacted with a ground penetrating radar (GPR), receiving a reflected signal, measuring Power spectral density (PSDm) and Peak to Peak Amplitude (PTPm) from the reflected signal, and calculating the compaction performance index by using the measured Power spectral density (PSDm) and Peak to Peak Amplitude (PTPm), said method further comprises steps of defining a Power spectral density reference (PSDr) and Peak to Peak amplitude reference (PTPr) by calibrating the ground penetrating radar (GPR) in the air or in the soil and calculating the compaction performance index by equation $$CPI = \frac{(PSDm(\text{Direct Wave}) \times FF + PTPm(\text{Direct Wave}) \times AF) \times 100}{(PSDr(\text{Direct Wave}) \times FF + PTPr(\text{Direct Wave}) \times AF)}$$

where $CPI$ = Compaction Performance index $PSDm$ = Power Spectral Density measured $PSDr$ = Power Spectral density reference $PTPm$ = Peak to Peak Amplitude measured $PTPr$ = Peak to Peak amplitude reference $FF$ = Frequency weight factor $AF$ = Amplitude weight factor.

2. The method according to claim 1, wherein the method further comprises steps of determining a location of each survey point, and storing the determined location and the corresponding compaction performance index value to a computer readable medium.

3. The method according to claim 2, wherein the locations of the survey points are determined using satellite positioning system, such as GPS (global positioning system), which satellite positioning system is arranged to said movable compaction device.

4. The method according to claim 1, wherein the electromagnetic measurement device is arranged to said movable compaction device, and the determination of the compaction performance index value is done real-time continuously or periodically during movement of the compaction device.

5. The method according to claim 1, wherein the wideband electromagnetic pulses are sent to the material to be compacted within 30 cm movement of the compaction device.

6. The method according to claim 1, wherein the method further comprises a step of defining an optimum value or range for the compaction performance index, which optimum value or range corresponds to an optimum gravimetric moisture content, optimum volumetric moisture content or optimum saturation degree of the material to be compacted.

7. The method according to claim 6, wherein the method further comprises steps of comparing the determined compaction performance index values of the material layer to be compacted and the optimum value or range of the compaction performance index and adjusting the operation of the movable compaction device, when the determined compaction performance index values differ from the optimum value or range of the compaction performance index.

8. The method according to claim 7, wherein the movable compaction device is a roller compactor and comparison of the determined compaction performance index values of the material to be compacted and the optimum value or range of the compaction performance index is done on the compaction work site by an operator of the roller compactor.

9. The method according to claim 7, wherein the determined compaction performance index values of the material to be compacted and the optimum value or range of the compaction performance index are transmitted to a remote location, preferably to a construction site project office, the comparison of the determined compaction performance index values of the material to be compacted and the optimum value or range of the compaction performance index is done in the remote location and instructions to adjust the operation of the movable compaction device are transmitted from the remote location to the operator of the movable compaction device.

10. The method according to claim 1, wherein a number of passes of the compaction device over a compacted area is calculated and the number of passes and the determined compaction performance index values over the compacted area are stored to a computer readable medium.

* * * * *